Nov. 8, 1960  H. REIMERS  2,959,466
PROCESS FOR THE RECOVERY OF SYNTHETIC ANHYDRITE
Filed Nov. 20, 1957
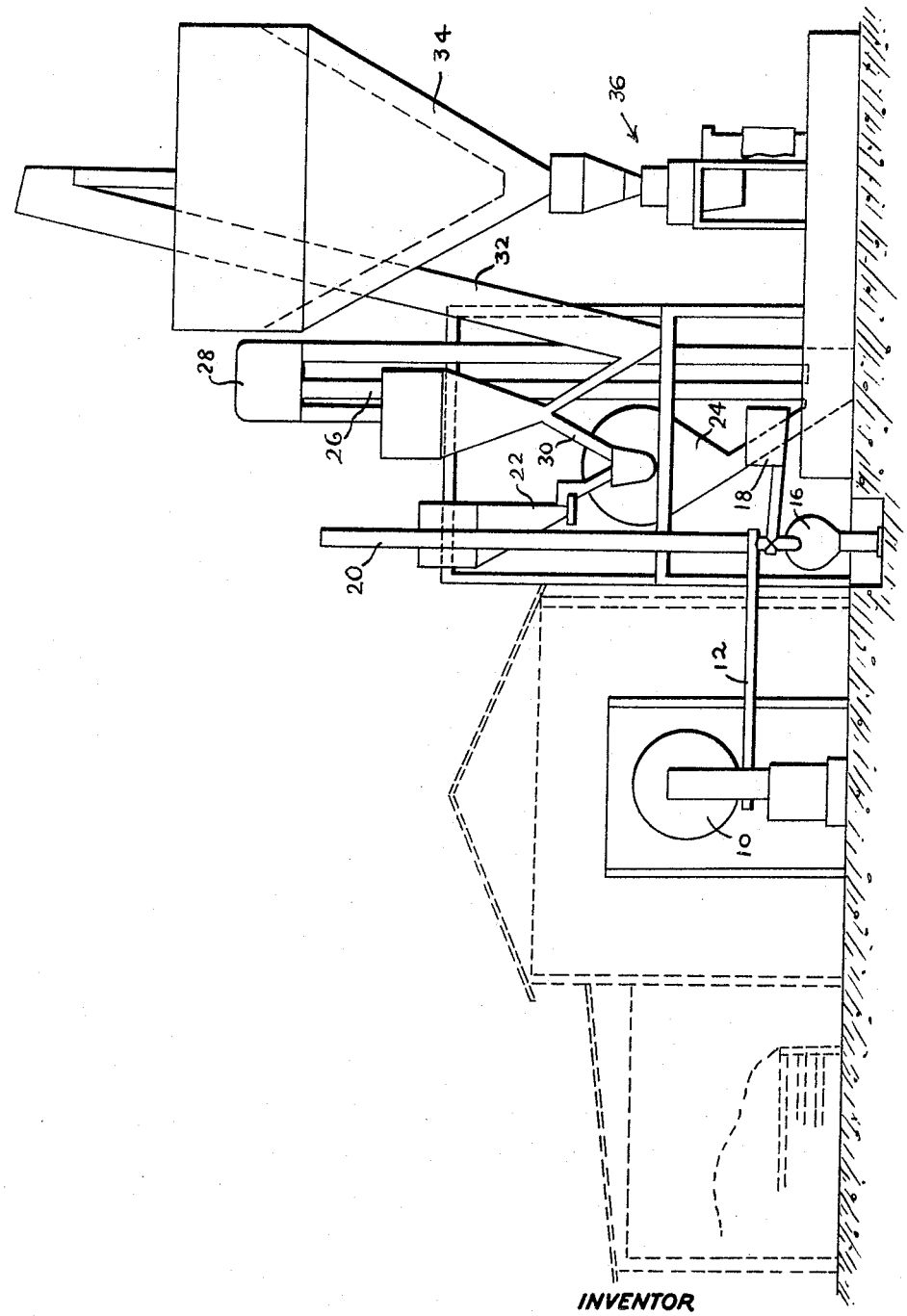
INVENTOR
HINRICH REIMERS
BY: *Maybee & Legris*
ATTORNEYS 2,959,466

PROCESS FOR THE RECOVERY OF SYNTHETIC ANHYDRITE

Hinrich Reimers, Neustadt an der Weinstrasse, Germany, assignor to Rofusa N.V., Willemstad, Curacao, Netherlands Antilles, a corporation of the Netherlands Antilles Filed Nov. 20, 1957, Ser. No. 697,562

Claims priority, application Germany Nov. 21, 1956

9 Claims. (Cl. 23—122)

This invention relates to a process for the recovery of synthetic anhydrite, for use especially as a binding agent in the manufacture of plaster, mortar and other building material, from the waste residues from the manufacture of hydrofluoric acid.

In the manufacture of hydrofluoric acid from calcium fluoride and sulphuric acid, calcium sulphate is obtained as a by-product as shown in the following equation:

$$CaF_2 + H_2SO_4 = 2HF + CaSO_4$$

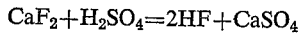

This anhydrite, which results from a chemical process, is a synthetic anhydrite and is distinguishable in many respects from naturally occuring anhydrite.

In the past, this synthetic anhydrite has been treated as a waste product and thrown on to waste heaps or discharged into rivers. After some time the question of its disposal and the contamination of river water has raised increasingly difficult problems and attempts have been made to find a use for it.

The first attempts occurred in connection with residues from a "batch" process, in which precisely measured quantities of calcium fluoride and sulphuric acid are reacted with each other in rotating and heated steel drums. This manufacturing process is now obsolete. In modern factories, hydrofluoric acid is manufactured as a continuous operation with constant filling and unloading of rotating and heated steel reaction vessels.

One problem in making synthetic anhydrite usable lies in the neutralization of the excess sulphuric acid which is contained in the residues from the process.

When the residues are produced on a "batch" basis, this problem can be solved comparatively easily; towards the end of the reaction time, calicum hydroxyde $Ca(OH)_2$ is fed into the reaction vessels to neutralize the sulphuric acid. The water released by this reaction is removed from the vessels together with remaining volatile hydrofluoric acid.

This is not possible in case of continuous operation, because the neutralization of the waste residue can only take place after it has left the reaction vessels. Furthermore, the surplus of sulphuric acid in the residue, which amounts to some 1 to 2% in the discontinuous process, is materially higher (up to about 10%) in the continuous process. The reason for this is that, to obtain a good yield for hydrofluoric acid, there must be a large surplus of sulphuric acid, because the calcium fluoride content in the fluoride used is variable.

By the process according to the invention the residue produced in the conventional continuous process for producing hydrofluoric acid can be successfully neutralized with a suitable basic material by pulverising and mixing the two materials together at an elevated temperature of above 100° C. until the surplus acid contained in the anhydrite is chemically neutralized.

In carrying out the process, it is essential that the formation of the semi-hydrate be prevented. The principal factors that tend to prevent such formation are a sufficiently high reaction temperature of above 100° C., prevention of access to the residues of moisture from the air or other sources, and thorough mixing of the residues with the basic neutralizing material during the neutralization process.

A temperature of at least 100° C. represents the lowest neutralization reaction temperature for producing a product of good quality.

This temperature can be reached, if the high temperature of the raw anhydrite, which normally lies above 100° C., when the residues leave the reaction vessel, is kept above 100° C., until neutralization has been completed. If the neutralizing vessel is sufficiently close to the hydrofluoric acid producing apparatus, the temperature of the residue is generally sufficient to maintain a proper working temperature. Insulation of the conduits carrying the raw anhydrite to the neutralizing vessel will enable greater distances to be covered without substantial heat loss. If necessary, a source of heat may be employed to directly raise or maintain the temperature behind the reaction vessel.

In manufacturing hydrofluoric acid there are however processes, in which the temperature of the residues, leaving the reaction vessel are considerably above 100° C. Furthermore the temperatures are increased by the considerable heat, caused in the process of neutralization, especially if CaO is used. This also depends on the fluctuating temperature of the air, which greatly delays the cooling of the material above all in summer and in tropical countries.

Experiments have shown, that too high temperatures considerably disturb the process of manufacturing adequate synthetic anhydrite. At comperatively low temperatures, which however must lie above 100° C., water released in the process of neutralization forms mainly dihydrate (2 molecules of water). Thereby only a comparatively small amount of $CaSO_4$ is changed into $CaSO_4.2H_2O$. This is not important. In the case of high temperatures however the water, released in the process of neutralization, forms a considerable amount of semi-hydrate, whereby a much larger amount of $CaSO_4$ is changed into $CaSO_4.\frac{1}{2}H_2O$. But semihydrate leads to an increase of water, needed by the anhydrite and thereby to too premature setting. Besides this, the increased absorption of water of the anhydrite mortar results in essentially diminished strength of the mortar. The chemical and physical changes, caused by the influence of too high temperatures not only decrease the strength of the mortar manufactured with synthetic anhydrite; owing to the inequality of the chemical, structural and qualitative composition, they cause tensions in the further processing of the material, which, as experiments have proved, may lead to considerable damage in practice. In many cases the material can then not be used at all. Therefore it is necessary to maintain the temperature of the synthetic anhydrite from the beginning at a level, which, also considering the chemical and physical increase of temperatures, caused during the process of neutralization, which in their turn are influenced by the temperature of the outside air, prevent as far as possible the forming of semi-hydrates.

It has been proved, that these dangers can be especially prevented, if the neutralization is carried out at an initial temperature of at least 100° C. and at most 150° C. This can be achieved by suitable cooling installations which decrease the temperature of the non-neutralized anhydrite, emerging from the reactor vessels at higher temperatures to a temperature of more than 100° C. but less than 150° C.

Access to the raw anhydrite of air-borne or other moisture may be prevented by sealing the apparatus off from the atmosphere, or by passing a stream of dry air or other dry gas through the apparatus.

Preferably the process is carried out in such a way that the raw anhydrite, normally produced in the form of coarse lumps, is quickly brought into close contact with fine granulated basic material so that the materials are intimately and fully intermixed.

The neutralization is preferably carried out in a disintegrating and mixing apparatus, such as a hammer mill, grinder or ball mill. The disintegrating during neutralization should preferably be sufficient to reduce the anhydrite particles to less than 2 mm. in diameter.

The basic neutralizing material can be mixed with the anhydrite before, or at the same time, as the raw anhydrite residue reaches the disintegrator. The latter is the preferable procedure.

Suitable basic neutralizing materials are calcium oxide (CaO), calcium hydroxide ($Ca(OH)_2$) and calcium carbonate ($CaCO_3$). The preferred material is CaO. The advantages of using this material rather than one of the other suitable basic neutralizing materials are unexpectedly substantial, as set out in co-pending application Serial No. 645,905 of Helmut Hanusch, filed March 14, 1957. One particular advantage of using the preferred basic neutralizing material rather than such materials as calcium hydroxide or calcium carbonate, lies not only in the aggressive effect of CaO but also in the fact that in this case sufficient heat may be produced by the neutralization process itself to maintain satisfactory reaction temperature.

The attached drawing is a diagrammatic elevational view of apparatus suitable for carrying out the invention.

As disclosed in the said copending application Serial No. 645,905, an anhydrite with a $CaSO_4$ content of roughly 90% and a $H_2SO_4$ content of 10.4%, before neutralization, if neutralized with calcium oxide, gave a mortar having minimum compression strengths after 1, 7 and 14 days of drying, respectively, of 274, 334 and 453 kg./cm.$^2$ as compared to corresponding minimum compression strengths of mortar products by calcium carbonate neutralization of 190, 243 and 328 kg./cm.$^2$. This means that the use of calcium oxide gives an average increase in compression strength of mortar produced of over 33%. The corresponding figures for mortar produced from synthetic anhydrite made by neutralizing the acid residue with calcium hydroxide exhibit an average increase of compression strength of about 24%.

The residue from the hydrofluoric acid reaction vessel 10 is carried by a screw conveyor 12 to a neutralizer 16 in which grinding and mixing takes place. At temperatures of more than 150° C., a cooling installation is incorporated immediately behind the reactor vessel 10, which can reduce the temperature during the transport to the neutralizer 16 to less than 150° C. The basic neutralizing material is fed to the neutralizer from a hopper 18. After neutralization, the anhydrite is transferred by a bucket elevator 20 and slide 22 into a ball mill 24 for grinding, preferably to 170 mesh size. From the ball mill it is transported by a bucket elevator 26 to an air separator 28. Particles that fail to meet the size requirements are returned to the ball mill by the conduit 30, and the properly sized particles are transferred through a bucket elevator 32 into a silo 34 for storage. Weighing and packaging of the product is then carried out through the conventional apparatus 36.

It is important, that after neutralization and especially after grinding, the temperature is maintained at less than 150° C. Before storing in the silo, the temperature must be decreased to less than 100° C.

The water content of the finished material should be less than 2%, and conventional water removing means may be incorporated in the neutralizer and in the various conduits leading from the disintegrator to the storage silo, particularly at the point where the product is cooled, for at this point water may condense from air under conditions of high relative humidity.

The product may be improved by neutralizing the raw anhydrite with a relatively large excess of the basic neutralizing material, if calcium oxide or hydroxide or carbonate is used, or by adding to the neutralized product about ten to twenty percent of calcium hydroxide. The result is a product with a delayed setting time and improved workability.

The recovered product can be activated for use in the building industry, for instance, as a cement, by any suitable means known in the art. The preferred activation operation however, comprises the novel process of adding a mixture of about 0.5% of an alkali sulphate or bisulphate and preferably potassium sulphate, and about 1.5% of calcium hydroxide or oxide.

The foregoing description sets forth the best mode contemplated by the inventor of carrying out his invention, but the following claims are intended to cover all useful changes and modifications of the said mode which are within the scope of the invention.

What I claim as my invention is:

1. A process for recovering synthetic anhydrite, for use as an inorganic building material binder, from the hot calcium sulfate sludge produced by the continuous process of manufacturing hydrofluoric acid through the action of concentrated sulfuric acid on calcium fluoride, the said sludge consisting substantially entirely of a major proportion of anhydrous calcium sulfate and a minor proportion of substantially anhydrous sulfuric acid, comprising mixing with the sludge at a temperature of more than 100° C. while substantially preventing access to the residue of moisture from the air or other sources, a dry, basic neutralizing material selected from the group consisting of calcium oxide, calcium hydroxide and calcium carbonate in an amount sufficient to neutralize the sulfuric acid, and allowing the neutralization to proceed to completion, the temperature of the sludge at the beginning of the neutralization reaction not exceeding 150° C.

2. A process as claimed in claim 1 in which the basic neutralizing material is calcium oxide.

3. A process as claimed in claim 1 in which the temperature of the hot sludge is substantially above 150° C. and cooling means are employed to reduce its temperature to between 100° C. and 150° C. before it is mixed with the basic neutralizing material.

4. A process as claimed in claim 1 in which cooling means are employed during the neutralization reaction to maintain the temperature within the range of 100° C. to 150° C.

5. A process as claimed in claim 1 in which the neutralized synthetic anhydrite is cooled to a temperature below 150° C. before it is stored.

6. A process as claimed in claim 4 in which the neutralized synthetic anhydrite is cooled to a temperature below 100° C. before it is stored.

7. A process as claimed in claim 1 in which the sludge is finely ground with the basic neutralizing material in a grinding apparatus.

8. A process as claimed in claim 7 in which the said grinding effects reduction to a particle size of not greater than 2 mm.

9. A process as claimed in claim 1 comprising the step of grinding the neutralized product to 170 mesh.

References Cited in the file of this patent
UNITED STATES PATENTS

| | | |
|---|---|---|
| 2,418,590 | Linzell et al. | Apr. 8, 1947 |
| 2,655,430 | Schiermeier | Oct. 13, 1953 |